(12) United States Patent
Liu

(10) Patent No.: US 9,183,214 B2
(45) Date of Patent: Nov. 10, 2015

(54) METHOD AND APPARATUS FOR DATA STORAGE AND DOWNLOADING

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 71 days.

(21) Appl. No.: 14/232,273

(22) PCT Filed: Feb. 17, 2013

(86) PCT No.: PCT/CN2013/071616
§ 371 (c)(1),
(2) Date: Jan. 12, 2014

(87) PCT Pub. No.: WO2013/143363
PCT Pub. Date: Oct. 3, 2013

(65) Prior Publication Data
US 2014/0149457 A1 May 29, 2014

(30) Foreign Application Priority Data

Mar. 29, 2012 (CN) .......................... 2012 1 0087144

(51) Int. Cl.
*G06F 17/30* (2006.01)
*H04L 29/08* (2006.01)

(52) U.S. Cl.
CPC .... *G06F 17/30106* (2013.01); *G06F 17/30097* (2013.01); *G06F 17/30209* (2013.01); *G06F 17/30289* (2013.01); *H04L 67/1097* (2013.01)

(58) Field of Classification Search
CPC .................... G06F 17/30097; G05F 17/30209
See application file for complete search history.

(56) References Cited

U.S. PATENT DOCUMENTS 6,542,933 B1 4/2003 Durst, Jr. et al.
6,701,317 B1 * 3/2004 Wiener et al. ......................... 1/1
(Continued)

FOREIGN PATENT DOCUMENTS

CN        1845098 A   10/2006
CN      101192234 A    6/2008
(Continued)

OTHER PUBLICATIONS

The World Intellectual Property Organization (WIPO) International Search Report for PCT/CN2013/071616 Feb. 17, 2013.

*Primary Examiner* — Mohammad S Rostami
(74) *Attorney, Agent, or Firm* — Anova Law Group, PLLC

(57) ABSTRACT

The present invention discloses a data storage method, a data downloading method, and a related apparatus. The data storage method includes: receiving a storage request containing a uniform resource locator (URL) for a storage operation; acquiring the URL in the storage request; determining whether a URL schema corresponding to the URL is in a storage, the URL schema corresponding to different URLs for a same file under a same domain name; when the URL schema is in the storage, completing the storage operation without storing the URL; when the URL schema is not in the storage, determining a hash value of a file corresponding to the URL and a hash value of the URL schema, and storing mapping relationship information between the file hash value and the URL schema hash value in the URL index database. The storage resource usage of the URL index database is reduced.

10 Claims, 5 Drawing Sheets

(56) References Cited

U.S. PATENT DOCUMENTS

2004/0210826 A1* 10/2004 Najork ................ 715/501.1
2006/0225115 A1* 10/2006 Barrett et al. ............ 725/113
2010/0125567 A1* 5/2010 Morris .................. 707/722
2011/0258050 A1* 10/2011 Chan et al. ........... 705/14.66
2012/0110112 A1* 5/2012 Luna et al. ............... 709/213

FOREIGN PATENT DOCUMENTS

| CN | 101950312 A | 1/2011 |
| WO | 2011038032 A2 | 3/2011 |

\* cited by examiner

METHOD AND APPARATUS FOR DATA STORAGE AND DOWNLOADING

CROSS-REFERENCES TO RELATED APPLICATIONS

This application claims the priority of Chinese patent application no. 201210087144.6, filed on Mar. 29, 2012, the entire contents of which are incorporated herein by reference.

FIELD OF THE INVENTION

The present invention relates to the software testing field and, more particularly, to a data storage method, a data downloading method, and a corresponding apparatuses.

BACKGROUND

With the wide availability of broadband networks and the increasing speed of the network transmission, it is now possible to use the Internet resources to achieve online multimedia download and playback. It has been realized to transmit and play back the audio, video and other multimedia information on the Internet.

However, in order to further improve the utilization of existing network resources, various solutions have been introduced to increase the download speed, including the P2P (Peer to Peer) mode. Such mode realizes a point-to-point network, that is, one user terminal can directly form an uploading and downloading relationship with another user terminal. The download speed is then closely related to the upload speed of the other end. Because the upload speed for most users is not fast, and the upload speed can be further limited by some users, the P2P upload often lacks enough bandwidth, slowing down P2P transmission.

The P2S (Peer to Server) mode is based on a user-to-server structure. The user directly downloads files from a large scale download website. The files are stored in the server in the download website, so the speed can be guaranteed. However, problems, such as scattered resources and difficulties on searching, etc., still exist.

The P2SP mode is based on the user-to-server-plus-user structure. Unlike the P2P and the P2S, the P2SP download mechanism is actually a further extension of the P2P technology. The P2SP mode not only supports the P2P technology, but also uses an index database to integrate the resources of the server and the resources of the P2P together. When a file is downloaded by a user, other resources will be automatically searched, and the appropriate resource is selected to accelerate the download process. This leads to a large improvement over the traditional P2P solution on the download stability and speed.

In the existing P2SP solutions, when a file is downloaded, the data may come from different sources as the original link, the P2P network, and the third-party mirrored site, and then the data is integrated to a complete file using a unique identifier of the complete file, such as MD5 (Message Digest Algorithm 5) or SHA (Secure Hash Algorithm). FIG. 1 is a specific flow chart for the existing P2SP downloading process. As shown in FIG. 1, the downloading process may include followings.

Step 101: when a downloading client terminal needs to download a file, the downloading client terminal acquires a URL (Uniform Resource Locator) link from the Internet or a resource website.

Step 102: The downloading client terminal uses the URL link as an entrance point, queries a resource index server for multiple resources and a file hash, and then downloads the data from the retrieved URL(s) after the query.

Step 103: After the downloading client terminal completes the download of the file, the downloading client terminal registers file information to a Tracker (the tracking point) server.

Step 104: Other downloading client terminals can find the peers who have completed the download process and the peers who are in the middle of the download process through the Tracker service.

Step 105: Other downloading client terminals start a multi-source P2P download, and P2P peers exchange data among other another.

Step 106: After the download process is complete, the statistics information is reported to a statistics server.

The server obtains resources through two main approaches: client terminals take the initiative to report the resources to the server, and a backend server actively crawls and collects the appropriate download links using a crawler system, and then writes the download links into the resource index database for client terminals to query. The quantity and quality of the URL index collection is essential to the overall quality of the multi-source download services.

In existing HTTP (Hyper Text Transport Protocol) download protocol, due to the characteristics of the URL link, it is easy to technically take other's contents not in one's own server, bypassing the final page with the others' advertisements, to provide the contents to users directly on one's page with its own advertisements, such as for users' download.

When browsing, a complete web page often is not completely transmitted to the client terminal all at once. If the client terminal requests a page with many pictures and other information, the data transmitted back for the first HTTP request is an HTML (Hypertext Markup Language) text for this page. After the client terminal (e.g., the web browser) interprets the HTML text, the client's browser discovers that there are more files referred in the text. The client's browser then sends out one or more HTTP requests. After these requests are processed by the server, subsequence files are transmitted to the client, and then these files are put to the proper positions in the page by the client's browser. A complete page can be fully displayed only after multiple HTTP requests are sent and fulfilled.

Based on this mechanism, the hotlinking becomes possible. An Internet service provider can embed others' links into its own page, and displayed those links on its own page, which achieves the purpose of the hotlinking.

Currently, the commonly used anti-hotlinking method is to increase the threshold of the hotlinking, such as, changing the download website address based on the sources of the requests, inserting random numbers in the links requested to confuse the links, or adding timestamp information in the requested links With these methods, even if the hotlinking website contains the original link, the website cannot provide normal download services because the links will soon be expired. Because the generation of this kind of links is under the control of the original website, the threshold of hotlinking can be increased by modifying the link generation rules.

For example, the download address of a web site provided for a game file 17173_tlbb_0330580.exe for a period of time is in the following form: http://cdn1.download.17173.com/wangsu_key_XXXX00XXXXXXXXXX0059XXXXXX XX48 00XXXfXXXXXX00XXXX/t1/17173_tlbb_0330580.exe, where "XXXXXX" is a random number and, for the same file, the "XXXXXX" is different when the file is requested at different time.

From the backend download log of the P2SP download system, it may be found that a lot of download links for URL address paths with regular pattern of the random download addresses have been reported. In the current P2SP multi-source download technical solutions, when the download process is finished by the client terminal, the original download link corresponding to the task added by the client is saved in the database as a resource. When other clients start a query, the saved link is returned to the other clients as a download resource.

The multi-source download system may store the URL download links, mainly through reporting by the client terminals or obtaining by the server's web crawler. Those links are often directly written to the URL index database and the URL resource database. Therefore, a lot of links for the same file may be saved to the databases. For example, if one file is downloaded 100 thousand times, 100 thousand records of the links may be created. For popular files, one hash value may be associated to a huge URL collection, even hundreds of thousands of records, and it is also possible that hundreds of thousands of URLs are associated one hash file. Thus, when the URL resource collection or the correspondence between the hash value and the URLs, useless records may take up a lot of disk space, causing busy system disk IO and reduced resource query efficiency.

Thus, because a large number of URLs correspond to a same hash, multiple mapping records are stored in the database and in the memory for the same hash. A large amount of storage index resources are occupied, which may affect the system query efficiency and resource recording efficiency.

Further, because the original website adds random coefficients to the URL links to adjust the form of the links, when the P2SP software records download links, a large amount of same links (corresponding to the same file on the same server) are recorded. Even if only one valid download link is returned to the client terminal, a lot of storage resources are occupied in the server, reducing the system query efficiency.

The disclosed methods and systems are directed to solve one or more problems set forth above and other problems.

BRIEF SUMMARY OF THE DISCLOSURE

One aspect of the present disclosure includes a data storage method, a data downloading method, and a related apparatus. The data storage method includes: receiving a storage request containing a uniform resource locator (URL) for a storage operation; acquiring the URL in the storage request; determining whether a URL schema corresponding to the URL is in a storage, the URL schema corresponding to different URLs for a same file under a same domain name; when the URL schema is in the storage, completing the storage operation without storing the URL; when the URL schema is not in the storage, determining a hash value of a file corresponding to the URL and a hash value of the URL schema, and storing mapping relationship information between the file hash value and the URL schema hash value in the URL index database. The storage resource usage of the URL index database is reduced.

Another aspect of the present disclosure includes a data storage apparatus. The data storage apparatus includes a storage module, an acquiring module, a judging module, and a processing module. The storage module is used to store uniform resource locator (URL) schemas, and the acquiring module is used to, when the storage module receives a storage request for a storage operation, extract a URL in the storage request. Further, the judging module is used to determine whether a URL schema corresponding to the URL is stored in the storage module, wherein the URL schema is corresponding to different URLs for a same file under a same domain name. The processing module is used to, when the judging module determines that a URL schema corresponding to the URL is stored in the storage module, complete the storage operation without saving the URL into the URL resource index database and, when the judging module determines that a URL schema corresponding to the URL is not stored in the storage module, to determine the URL schema corresponding to the URL, a hash value of the file corresponding to the URL and a hash value of the URL schema and to save mapping relationship information between the file hash value and the URL schema hash value into the URL index database.

Other aspects of the present disclosure can be understood by those skilled in the art in light of the description, the claims, and the drawings of the present disclosure.

DETAILED DESCRIPTION

Figure 1:
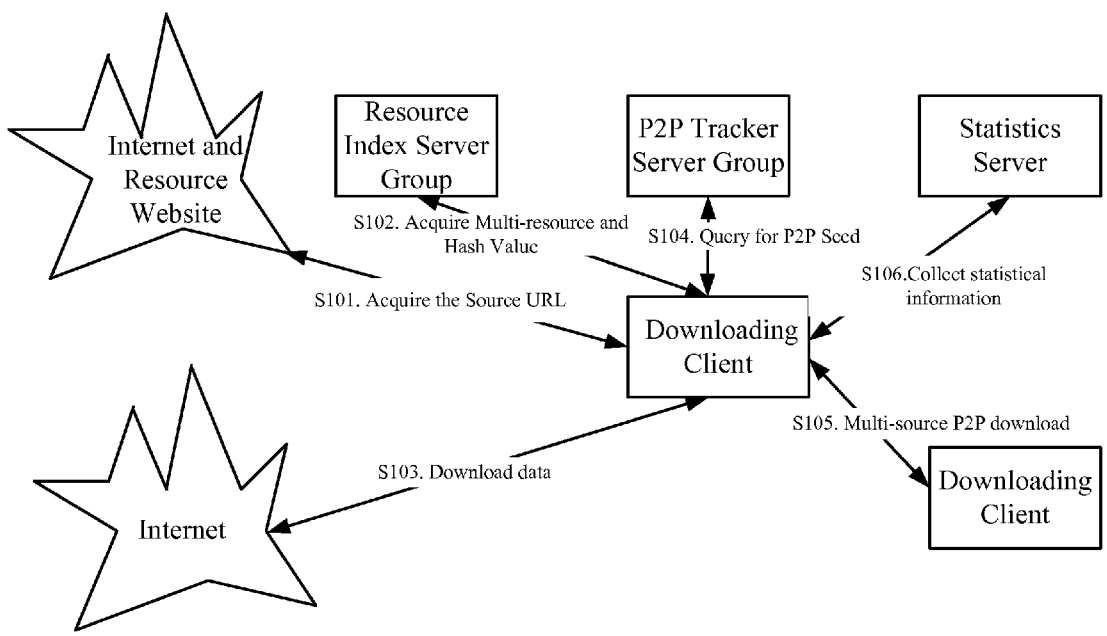
FIG. 1 is a specific flow chart for an existing P2SP downloading process.

Reference will now be made in detail to exemplary embodiments of the invention, which are illustrated in the accompanying drawings. Wherever possible, the same reference numbers will be used throughout the drawings to refer to the same or like parts.

Certain acronyms and definitions are listed as followings:

URL: Uniform Resource Locator, also referred to as a web page address.

P2P: Peer to Peer, a PPP-based peer-to-peer protocol, where data transfers, especially user download, are achieved by an arbitration intermediary server.

P2SP: Peer to Server & Peer, where Peer is a network node or terminal, such as a user computer.

P2SP System: an entire system with P2SP download capability, mainly divided into P2SP client (downloading client or downloading client terminal) and P2SP backend, which usually includes a set of functional servers to implement main functions of the P2SP system.

Downloading client terminal: a client terminal with P2SP download capability.

Tracker server: a functional server in the P2SP system backend, responsible for registering the P2P network user Peer information, maintaining online heartbeat, and Peer index information queries.

Resources index server: a functional server in the P2SP system backend, responsible for the multi-resource index information queries and indexing.

Url2hash server: a functional server in the P2SP system backend, referred to as the URL index server, responsible for providing a mapping relationship between the file URL and the Hash.

Hash2url server: a functional server in the P2SP system backend, referred to as the URL resource server, responsible for providing a mapping relationship between file Hash and URL source collection.

Statistics server: a functional server in the P2SP system backend, collecting information about user download file size, average speed, completion time, speed of various auxiliary sources, auxiliary source original links, and network status, etc.

Schema matching: a schema refers to a collection of a plurality of elements organized according to a certain structure, and schema matching refers to the process of inputting two schemas and calculating the semantic correspondence relationships among elements of the two schemas. Schema matching of two strings T and S can be conducted as: using string T as the main text and string S as the schema, finding the location in string T where the schema S appears for the first time. Once schema S is found in the main text T, a match occurs. Certain applications may require all matching locations.

Regular expression: refers to a single string used to describe or match a series of string of a syntactic rule. A regular expression is usually used to search and/or replace text content matching a schema.

The embodiments of the present invention provide a technical solution for the data storage and data download. In this technical solution, by analyzing the URLs for the same file under the same domain name (i.e., the same file from the same site), variable-number portions of an URL are separated from constant portions of the URL. Those portions that are variable but do not affect the final determination of the file corresponding to the URL are replaced with universal characters. Thus, the number of records in the URL index database and the amount of data needs to be saved are reduced. Further, the recording efficiency of the network resources is improved, and the size of the URL index database is reduced.

For example, for URL of http://disk23.sh.com/myfile/115816391/dpin/XXXX XXXXXXXXXXX003/121386XXXX/ XXXXXXXXXXXXXXXXXXXXXXXXXXXXXX X%ce%a8%c3%c0%be%a2%ce%e8%b5%c7%c2%bc% c6%f7v2.3.exe, the components in the URL include the domain name part, i.e., disk23.sh.com part, the file name part, i.e., %ce%a8%c3%c0%be%a2%ce%e8%b5%c7%c2%bc% c6%f7v2.3.exe, and the middle path part, i.e., the character string of /myfile/115816391/dpin/ XXXXXXXXXXXXXX003/121386XXXX/ XXXXXXXXXXXXXXXXXXXXXXXXXXXXXX.

The website and the file name can be determined for this file. Thus, a unique identifier corresponding to the file under this website can be marked as: disk23.sh.com_%ce%a8%c3%c0%be%a2%ce%e8%b5% c7%c2%bc%c6%f7v2.3.

For a new URL, the website name appended with the file name associated with the URL is set as the primary key, and the primary key is used to identify a unique file under a domain name (or website), and then the URLs corresponds to the file are stored together for analysis. Usually, after the number of URLs corresponding to the same website obtained either through reporting or crawling exceeds a preset threshold value (for example, 100), an URL schema analysis is performed. The analysis process is mainly performed through comparing these URLs and find out same parts and different parts among the URLs. The variable and constant parts of the URL are recognized by schema matching and regular expression. The variable parts of the URL can be abstracted as a universal character identifier(s).

For example, after the above URL is processed, the normalized schema can be: http://disk23.sh.com/myfile/115816391/dpin/X003/121386Y/ Z%ce%a8%c3%c0%be%a2%ce%e8%b5%c7%c2%bc% c6%f7v2.3.exe, where X, Y, and Z identify the variable parts in the URL. X, Y, and Z can be replaced by special wildcard characters not appearing in the real URL, or can be replaced by some special combinations of characters, such as -X-, etc. Any kind of appropriate forms of replacement can be used. When a new URL is obtained from the same website, if all other parts of the new URL, other than the X, Y, and Z parts, are the same as the URL processed before, then the new URL is considered to be the same URL as the one processed before.

Further, the above normalized URL schema is hashed, the hash value is configured to be the primary key for the URL index database and a mapping relationship is established between the URL schema hash value and the file hash value. The next time when a new URL is reported by the downloading client terminal or a web crawler, if the normalized schema of the new URL matches an existing URL schema, the URL is not inserted into the URL index database as a new record. Thus, the size of index database is effectively reduced. In addition, when the URL is stored to the URL resource database (the sources of URL link, Ref, also need to be recorded, i.e. the links in the page referred by the download link selected by the user, also known as the source page links). This type of URL only needs to be recorded and stored once, so there is no need to record every new URL corresponding to the same file into the URL resource database.

Figure 4:
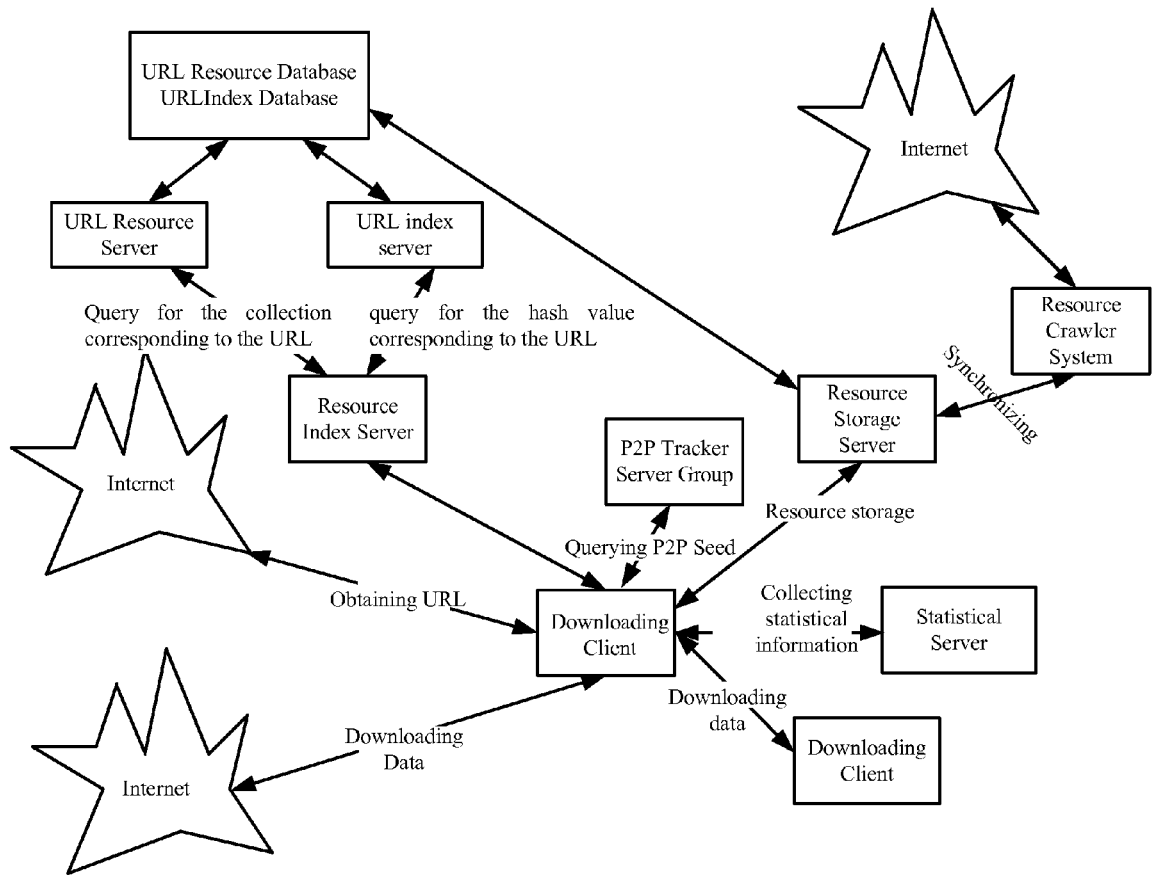
FIG. 4 illustrates an exemplary system structure incorporating certain disclosed embodiments.

FIG. 4 illustrates an exemplary system structure incorporating certain disclosed embodiments of the present invention. As shown in FIG. 4, the system may include the following components:

I. Downloading Client
  (1) The downloading client or downloading client terminal periodically reports the online status and locally stored resource information to a Tracker server.
  (2) Using the source URL, the downloading client queries the server for multiple resources, the hash value, and the file checksum information, and queries the Tracker server for peer client terminals (Peer).
  (3) After finishing the download task, the downloading client reports the download time, download speed, download result, file size, and security attributes to the statistical server.
  (4) In the downloading process, after detecting data fragmentation in the completed download, the data is checked. If a data fragmentation error is discovered, the downloading client reports the Peer, the URL, and the file hash value of the error source to the resource storage server.
  (5) If the first query does not find checksum information for a file, the file is considered as a new file. After the download is complete, the downloading client may extract the corresponding checksum information, the unique identifier of the file, the original URL, and the reference source, ref page, and report them to the resource storage server.

Ii. Resource Crawler System
  (1) The resource crawler system acquires a website resource page containing download resources.

(2) The resource crawler system extracts the downloadable file link from the download page, which is usually identified by the file extension name at the end of download link.

(3) The new link obtained by the resource crawler system is added into the data base by the resource storage server.

(4) The resource crawler system performs matching analysis on the new obtained link or on links from the configured download sites, extracts corresponding normalized schema, and then synchronizes the schema to the resource storage server and the URL index database server.

III. Resource Storage Server (1) The resource storage server receives the storage report request from the client terminal. After receiving the storage request, the resource storage server first queries the resource URL index database for information about the resource. If no matching record is found, the resource is directly saved into the database, prior to which the schema matching analysis for the URL link is also performed according to the matching rules. If the matching record is found, the corresponding fields (file size, hash identification) are checked to determine whether these fields are consistent. If the contents are consistent, the storage operation is completed. If the contents are inconsistent, the file is requested to be downloaded directly through the provided link, the corresponding fields are calculated, and then the inconsistent fields are verified.

(2) The resource storage server accepts new URLs come from the crawler system, downloads files based on those URLs, calculates the hash values of the files, and saves the data into the URL resource/index database.

(3) When updating the URL resource/index database, the data are processed according to the URL link schema extracting and matching rules, and the resource storage server filters out the storage request for different links with the same hash file under the same website.

IV. Tracker Server (1) The tracker server provides registration for every client terminal applying for joining the network, and feeds back the IP address list of its current resource node.

(2) The tracker server receives online status report from the client terminal, generates a node list for each resource node, and provides feedback when there is a download task requested by a node.

V. Resource Index Server (1) The resource index server receives from downloading client terminals query file hash and the multi-URL resource collection that need to be downloaded, using the URL as index.

(2) The resource index server provides the checksum of each file fragmentation to the downloading client terminals, so that the downloading client can check the validity of the downloaded data.

(3) When returning the multi-resource URL collection, the resource index server also returns the source Ref page address of each URL source.

VI. URL Index Server (1) The URL index server calculates a unique URL hash value for an original URL link, after standard coding, and establishing a mapping relationship between the URL and the hash value of the contents of the file, and then stores the result into the URL index database.

(2) When adding a task to the client terminal, the URL index server provides supporting services to a resource inquiry server, such as providing query service for the mapping relationship between the URL and the file hash value.

(3) The URL index server receives the synchronization from the resource storage server and records URL link schemas and, at the same time, performs matching on the URL link submitted by the client terminal according to the URL link schema.

(4) The URL index server queries the URL resource index database for the hash value corresponding to the URL.

VII. URL Resource Server (1) The URL resource server accepts the request from the multi-resource inquiry server to query the multi-resource URL collection based on the hash value.

(2) The URL resource server queries the URL resource index database for the URL collection corresponding to the hash value, and then returns the URL collection to the multi-resource inquiry server.

Figure 7:
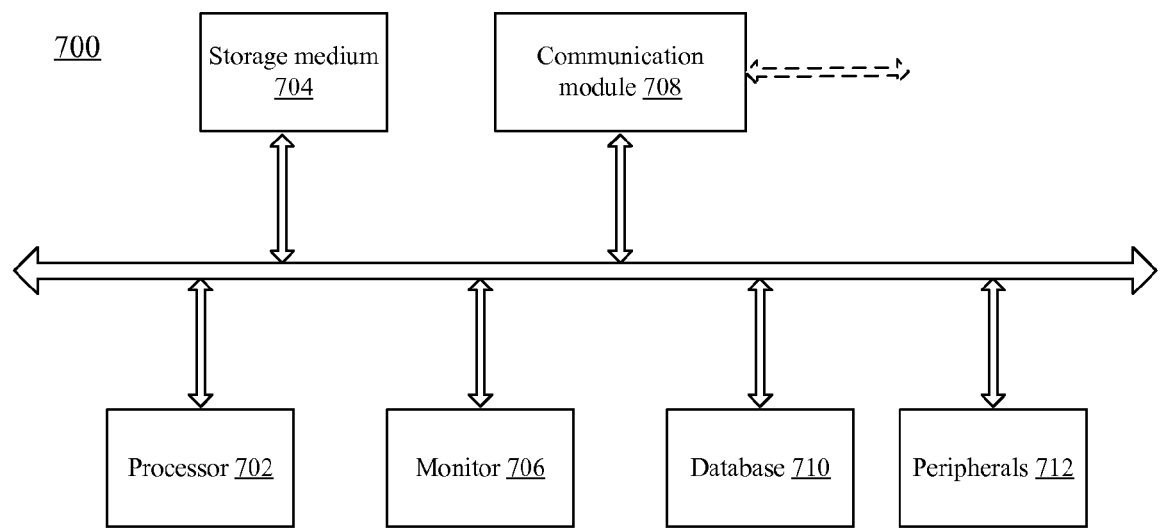
FIG. 7 depicts an exemplary computer system capable of implementing disclosed components in the P2SP system.

The various servers in the P2SP backend and the downloading client terminals may be implemented in any appropriate computer systems. FIG. 7 depicts an exemplary computer system 700 capable of implementing the disclosed components in the P2SP system.

As shown in FIG. 7, computer system 700 may include a processor 702, a storage medium 704, a monitor 706, a communication module 708, a database 710, and peripherals 712. Certain devices may be omitted and other devices may be further included.

Processor 702 may include any appropriate processor or processors. Further, processor 702 can include multiple cores for multi-thread or parallel processing. Storage medium 704 may include memory modules, such as ROM, RAM, and flash memory modules, and mass storages, such as CD-ROM, U-disk, hard disk, etc. Storage medium 704 may store any suitable computer programs for implementing various processes, when executed by processor 702.

Further, peripherals 712 may include I/O devices such as keyboard and mouse, and communication module 708 may include network devices for establishing connections through a wireless or wired communication network. Database 710 may include one or more databases for storing certain data and for performing certain operations on the stored data, such as database searching.

Figure 2:
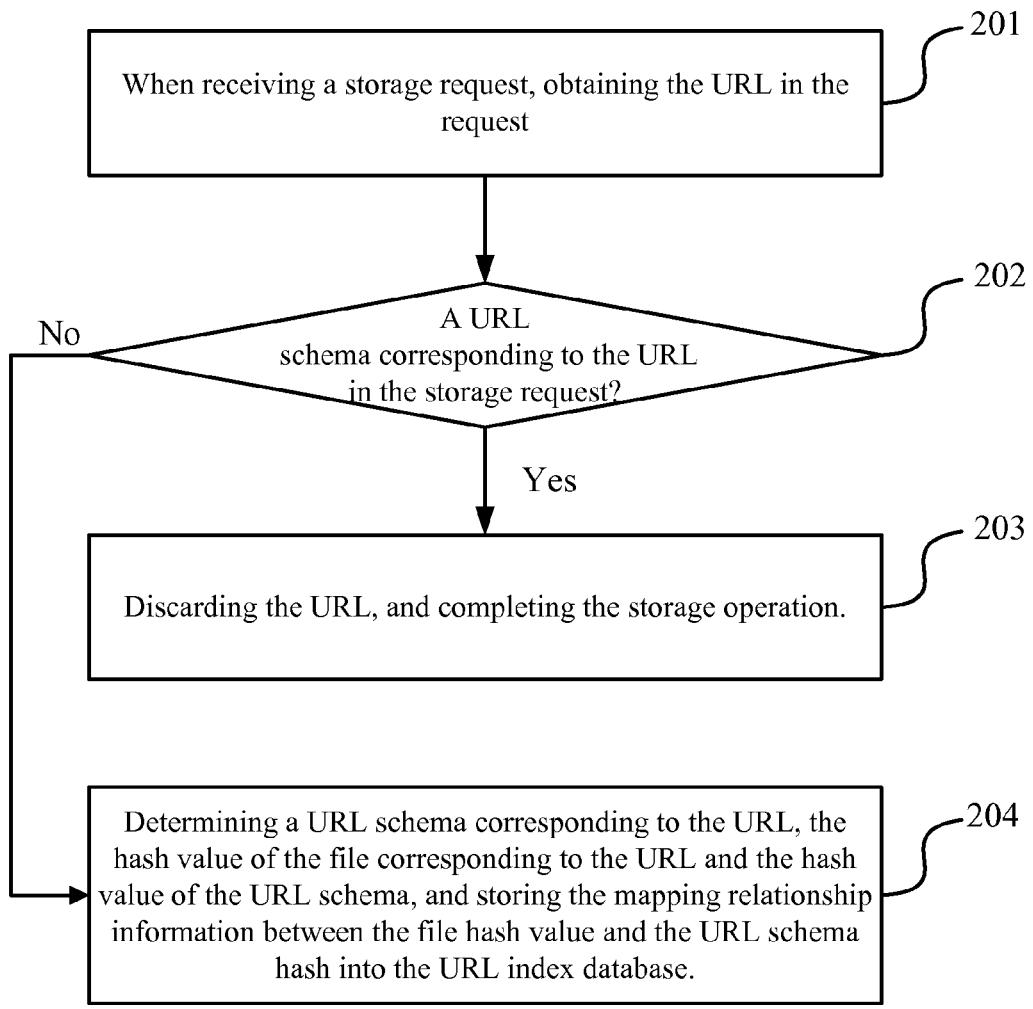
FIG. 2 shows a flow chart of a data storage process according to the exemplary embodiments of the present invention.

During operation, the P2SP system (e.g., computer system 700 implementing various servers) may perform certain processes for P2SP services. FIG. 2 shows a flow chart of a data storage process. As shown in FIG. 2, the data storage process includes the followings:

Step 201: when receiving a request for addition or storage into the database, i.e., a storage request, obtaining the URL in the request.

Specifically, in the exemplary embodiments of the present invention, the resource crawler system can periodically crawl down the download links (in the form of URL) from a download page, and report the crawled download links for storage processing (i.e. sending a storage request). At the same time, after a download task is completed, a downloading client terminal may report corresponding download links, which can be ready for the storage processing.

Step 202: determining if there is a URL schema corresponding to the URL to be stored. If it is determined that there is a corresponding URL schema, Step 203 is further executed; otherwise, Step 204 is further executed.

Specifically, in the exemplary embodiments of the present invention, in order to reduce the amount of data stored in the URL resource index database, the different links for the same file under the same web site are stored corresponding to the same schema.

After the URL carried in the storage request is obtained, it can be determined whether URL schema corresponding to the URL is stored locally. For example, the host computer information and file name information can be obtained from the URL in the storage request, and whether a corresponding URL schema is stored locally can be determined based on the obtained host computer information and file name information.

Step 203: the URL will not be saved into the URL resource/index database and the storage process is completed.

Step 204: determining a URL schema corresponding to the URL, as well as the hash value of the file corresponding to the URL and the hash value of the URL schema, and storing the mapping relationship information between the file hash value and the URL schema hash into the URL index database.

Specifically, in the exemplary embodiments of the present invention, after the URL schema corresponding to the URL in the storage request is determined, the hash value of the file corresponding to the URL is determined, and the hash value of the URL schema is also determined. Further, the mapping relationship information between the file hash value and the URL schema hash value is stored into the URL index database.

To determine the file hash value, when a storage request is reported from a downloading client terminal after completing the download task, the storage request may include the hash value of the file corresponding to the URL. When the storage request is sent from the resource crawler system, a download is requested using the URL in the storage request, and the hash value of the corresponding file can then be calculated.

It should be noted that, in practice, not every download web site provides a similar link method. In order to reduce unnecessary schema matching and analyzing, some domain names of the download sites can be pre-configured for matching and analyzing calculation. Similar treatments may also be performed in the process of querying the URL index database for the file hash value corresponding to URL. Because the sources of the URL entries submitted by users may vary, for those websites for domain name matching, the entry URLs provided by users are analyzed in the same way, and then the database is queried to obtain real links.

Figure 3:
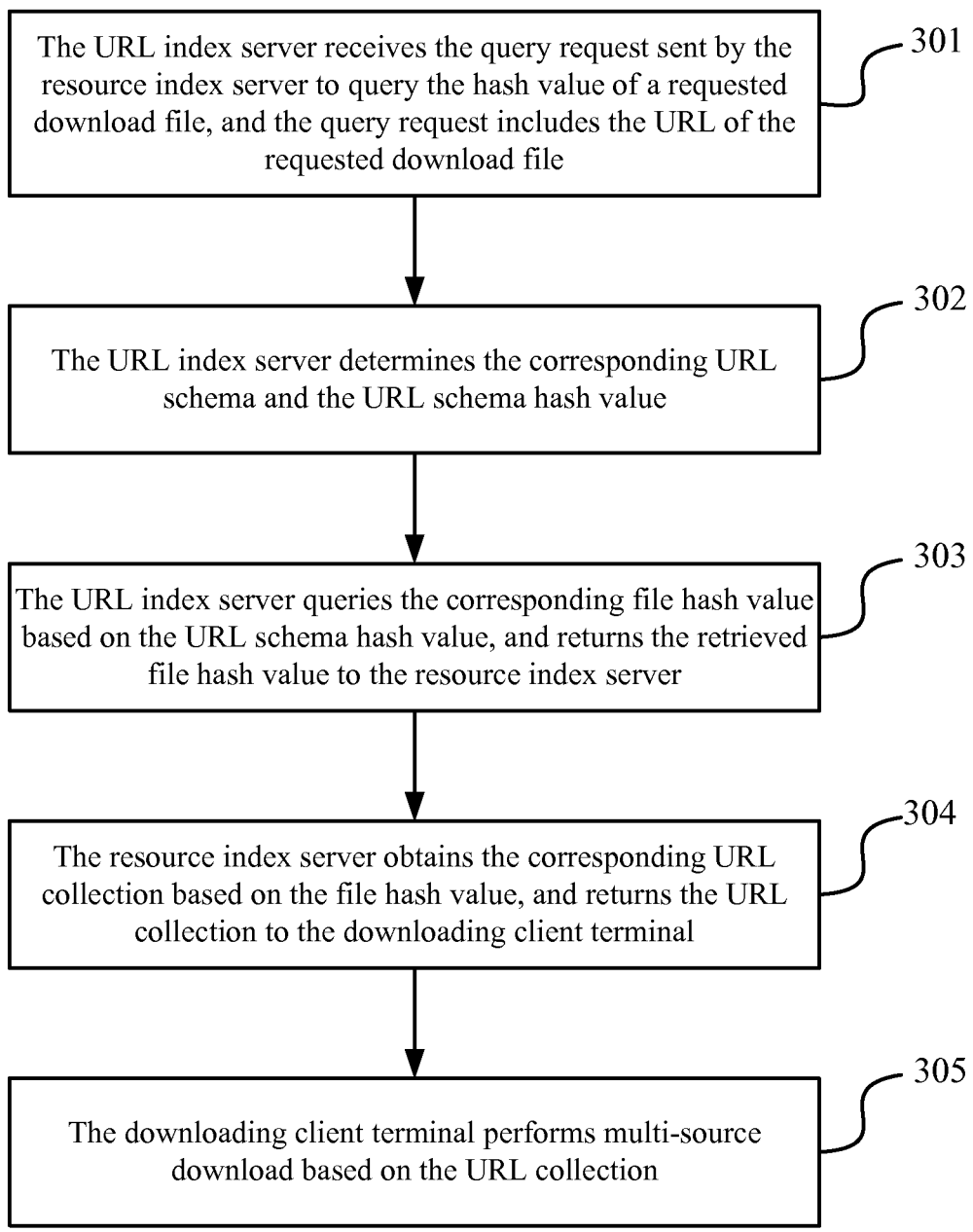
FIG. 3 shows a flow chart of a data download process provided by the exemplary embodiments of the invention.

Based on the above technical idea for the data storage, the invention also provides a data download method. FIG. 3 shows a flow chart of the data download process provided by the exemplary embodiments of the invention, the process may include the following:

Step 301: the URL index server receives the query request sent by the resource index server to query the hash value of a requested download file, and the query request includes the URL of the requested download file.

Specifically, in the exemplary embodiments of the present invention, when the downloading client terminal receives a data download request sent by a user, based on the URL in the request, the client terminal requests the resource index server to obtain other URLs related to the same file corresponding to the URL (a URL collection). Thus, the client terminal is able to perform multi-source download. After the resource index server receives the download request, it sends a query request to the URL index server to query the hash value of the requested download file, the query request includes the URL of the requested download file.

Step 302: based on the URL of the requested download file, the URL index server determines the corresponding URL schema and the URL schema hash value.

Specifically, after receiving the query request sent from the resource index server, the URL index server determines the URL schema corresponding to the URL in the query request, and determines the URL schema hash value.

Step 303: the URL index server queries the corresponding file hash value based on the URL schema hash value, and returns the retrieved file hash value to the resource index server.

Specifically, the URL index server sends the query request to the URL resource server to query the file hash value, and the query request includes the URL schema hash value corresponding to the file.

The URL index server receives the file hash value returned from the URL resource/index database after the URL resource/index database retrieves the file hash value corresponding to the URL schema hash value based on the received URL schema hash value and the mapping relationship information between the file hash value and the URL schema hash value.

Step 304: the resource index server obtains the corresponding URL collection based on the file hash value, and returns the URL collection to the downloading client terminal.

Specifically, after the resource index server has received the file hash value returned from the URL index server, the resource index server sends a URL query request to the URL resource server to query for the URL collection corresponding to the file hash value, and the query request includes the file hash value. After receiving the URL collection returned from the URL resource server, the resource index server sends the URL collection to the downloading client terminal.

Step 305: the downloading client terminal performs multi-source download based on the URL collection.

Therefore, in the exemplary embodiments of the present invention, by analyzing the download links for the same file provided by different websites, the variable-number parts and constant parts of the links are separated, the variable parts not affecting the final determination of the corresponding file can be replaced by universal characters. Thus, the scale of the URL index database and the amount of data need to be stored are reduced. The efficiency of the web resource storage and the efficiency for querying and mapping download resource are improved, and the size of URL resource database and the size of the URL index database are reduced. At the same time, by saving the reference page of the source page of the resource, the user can take the initiative to browse the links of the stored original page, while the interests of the service providers of the download links are also taken into account.

Figure 5:
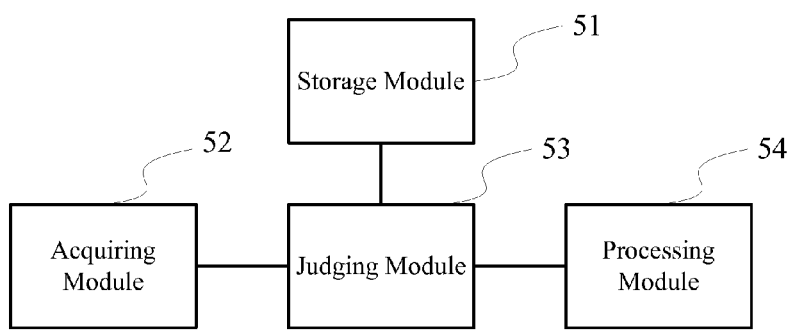
FIG. 5 shows a structure block diagram for a data storage apparatus provided by the exemplary embodiments of the present invention.

FIG. 5 shows a structure block diagram for a data storage apparatus provided by the exemplary embodiments of the present invention. As shown in FIG. 5, the data storage apparatus includes:

A storage module 51, used to store URL schemas. An acquiring module 52, used to acquire the URL in a storage request when the storage request is received by the data storage apparatus.

A judging module 53, used to determine whether a URL schema corresponding to the URL is stored in the storage module. The URL schema corresponds to different URLs for the same file under the same domain name.

A processing module 54, used to, when the determination result from the judging module 53 is "yes", complete the storage operation without saving the URL into the URL resource index database. On the other hand, when the determination result from the judging module 53 is "no", the processing module 54 determines a URL schema corresponding to the URL, the hash value of the file corresponding to the URL and the hash value of the URL schema. Further, the processing module 54 saves mapping relationship information between the file hash value and the URL schema hash value into the URL index database.

The processing module 54 can also be specifically used to, when the storage request is sent from a downloading client terminal, obtain the hash value of the file carried in the storage request. When the storage request is sent from the resource crawler system, the processing module 54 downloads the file corresponding to the URL in the storage request, and determines the hash value of the file.

The processing module 54 can also be used to, after determining the URL schema corresponding to the URL, save the URL schema in the storage module 51, and to save the URL schema in the URL index server.

The storage module 51 can also be used to store the domain name information corresponding to the URL which needs schema matching.

The judging module 53 can be specifically used to, when determining, based on the domain name information corresponding to the URL stored in the storage module 51, that the URL needs schema matching, to determine whether the storage module 51 stores the URL schema corresponding to the URL.

In certain embodiments, preferably, the data storage apparatus may be a resource storage server.

Figure 6:
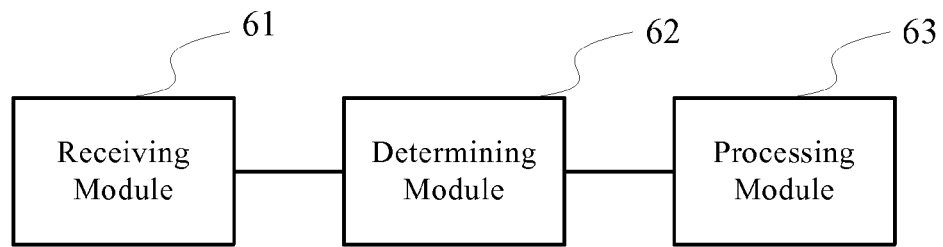
FIG. 6 shows a structure block diagram of a URL index server provided by exemplary embodiments of the present invention.

Based on the concepts of the above method embodiments, an exemplary URL index server can also be provided corresponding to the above process. FIG. 6 shows a structure block diagram of a URL index server provided by exemplary embodiments of the present invention. As shown in FIG. 6, the URL index server may includes:

A receiving module 61, used to receive a query request sent from a resource index server for querying the hash value of the download file, and the query request includes the URL of the requested download file.

A determining module 62, used to, based on the URL of the download file, determine the URL schema corresponding to URL, and determine the hash value of the URL schema.

A processing module 63, used to query the hash value of the corresponding file based on the hash value of the URL schema, and to return the retrieved file hash value to the resource index server. The resource index server acquires the URL collection corresponding to the file hash value, and returns the URL collection to the downloading e client terminal, so that the downloading client terminal can perform a multi-source download based on the URL collection.

The processing module 63 may be specifically used to send a query request to the URL index database for the file hash value, where the query request carries the hash value of the URL schema corresponding to the file, and to receive the file hash value returned from the URL index database. The URL resource/index database, based on the received URL schema hash value, the stored mapping relationship information between the file hash value and the URL schema hash value, queries the hash value of the file corresponding to the received URL schema hash value.

Through the above descriptions of the various embodiments, those skilled in the art can understand that the present invention can be implemented by software with certain common hardware platforms or by hardware. That is, the technical solutions of the present invention can be embodied in the form of computer software programs. The computer software programs are stored in a storage media, includes a certain number of instructions to configure a computer device (e.g., a personal computer, server, or web device, etc.) to perform the methods described in the various exemplary embodiments of the present invention.

Those skilled in the art can understand the accompanying drawings are only the diagrams of preferred embodiments. The modules or processes in the accompanying drawings are not all required to implement the present invention.

Those skilled in the art can also understand the modules in the apparatus in the exemplary embodiments can be distributed in the apparatuses in the exemplary embodiments in accordance with description of the exemplary embodiments, or can be distributed in one or multiple apparatuses different from the exemplary embodiments. The modules of the above exemplary embodiments can be combined into one module, or can be further split into multiple sub-modules.

The embodiments disclosed above are only several specific exemplary embodiments of the present invention. However, the present invention is not limited to the disclosed embodiments, and any change obvious to those skilled in the art should fall into the scope of protection of the present invention.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art.

The disclosed methods and systems can be used in a variety of internet applications, especially in data storage and downloading applications. By using the disclosed methods and systems the download links for the same file provided by different websites are analyzed, the variable-number parts and constant parts of the links are separated, the variable parts not affecting the final determination of the corresponding file can be replaced by universal characters. Thus, the scale of the URL index database and the amount of data need to be stored are reduced. The efficiency of the web resource storage and the efficiency for querying and mapping download resource are improved, and the size of URL resource database and the size of the URL index database are reduced. At the same time, by saving the reference page of the source page of the resource, the user can take the initiative to browse the links of the stored original page, while the interests of the service providers of the download links are also taken into account.

What is claimed is:
1. A method for data storage, comprising:
receiving a storage request containing a uniform resource locator (URL) for a storage operation;
acquiring the URL in the storage request;
determining whether a URL schema corresponding to the URL is in a storage, the URL schema corresponding to different URLs for a same file under a same domain name;
when it is determined that the URL schema is in the storage, completing the storage operation without storing the URL in a URL index database;
when it is determined that the URL schema is not in the storage, determining a hash value of a file corresponding to the URL and a hash value of the URL schema, and storing mapping relationship information between the hash value of the file and the hash value of the URL schema in the URL index database, wherein determining the hash value of the file corresponding to the URL includes:
  if the storage request is a storage request sent from a downloading client terminal, acquiring a file hash value in the storage request as the hash value;
  if the storage request is a storage request sent from a resource crawler system, downloading the file corresponding to the URL in the storage request, and determining the hash value of the downloaded file.

2. The method according to claim 1, after determining the URL schema corresponding to the URL, further including:
  saving the URL schema and storing the URL schema in the URL index server.

3. The method according to claim 1, wherein determining whether the URL schema corresponding to the URL is in the storage includes:
  based on domain name information of the URL for schema matching in the storage, determining whether the URL needs schema matching; and
  determining whether the URL schema corresponding to the URL is stored in the storage.

4. The method according to claim 1, wherein determining whether the URL schema corresponding to the URL is in the storage includes:
  when the URL is not stored in the URL resource database, determining whether the URL schema corresponding to the URL is stored in the storage.

5. The method according to claim 1, further including:
  receiving, by the URL index server, a query request sent from a resource index server for querying a hash value of a download file, the query request including a URL of the download file;
  determining, by the URL index server, the URL schema corresponding to the URL based on the URL of the download file, and determining the hash value of the URL schema;
  querying, by the URL index server, the hash value of the corresponding file based on the hash value of the URL schema;
  returning, by the URL index server, the retrieved file hash value to the resource index server;
  acquiring, by the resource index server, a corresponding URL collection based on the file hash value; and
  returning the URL collection to the downloading client terminal, such that the downloading client terminal performs a multi-source download using the URL collection.

6. The method according to claim 5, where the URL index server querying the hash value of the corresponding file based on the hash value of the URL schema further includes:
  sending, by the URL index server, the query request for the file hash value to the URL index database, the query request including the hash value of the URL schema corresponding to the file;
  receiving, by the URL index server, the file hash value returned by the URL index database, wherein the URL index database queries the file hash value corresponding to the received URL schema hash value based on the received URL schema hash value and the mapping relationship information between the file hash value and the URL schema hash value stored in the storage.

7. A data storage apparatus, comprising one or more processors, and one or more program modules to be executed by the one or more processors, the one or more program modules comprising:
  a storage module used to store uniform resource locator (URL) schemas;
  an acquiring module used to, when the storage module receives a storage request for a storage operation, extract a URL in the storage request;
  a judging module used to determine whether a URL schema corresponding to the URL is stored in the storage module, wherein the URL schema is corresponding to different URLs for a same file under a same domain name;
  a processing module used to, when the judging module determines that a URL schema corresponding to the URL is stored in the storage module, complete the storage operation without saving the URL into the URL resource index database and, when the judging module determines that a URL schema corresponding to the URL is not stored in the storage module, to determine the URL schema corresponding to the URL, a hash value of the file corresponding to the URL and a hash value of the URL schema and to save mapping relationship information between the file hash value and the URL schema hash value into the URL index database,
  wherein the processing module is used to, when the storage request is a storage request sent from a downloading client terminal, acquire the hash value of the file in the storage request; and when the storage request is a storage request sent from a resource crawler system, to download a file corresponding to the URL in the storage request and to determine the hash value of the file.

8. The data storage apparatus according to claim 7, wherein:
  the processing module is also used to, after determining the URL schema corresponding to the URL, save the URL schema in the storage module and to store the URL schema into the URL index server.

9. The data storage apparatus according to claim 7, wherein:
  the storage module is also used to store domain name information corresponding to the URL requiring schema matching; and
  the judging module is used to, when determining that the URL needs schema matching based on the stored domain name information corresponding to the URL requiring schema matching, determine whether a URL schema corresponding to the URL is stored in the storage module.

10. The data storage apparatus according to claim 7, wherein:
  the judging module is used to, when it is determined that the URL is not stored in the URL resource database, determine whether the URL schema corresponding to the URL has been stored locally.

* * * * *